R. POLIAKOFF.
LEAD CABLE COVERING PRESS.
APPLICATION FILED FEB. 1, 1921.
1,427,698.
Patented Aug. 29, 1922.
9 SHEETS—SHEET 5.
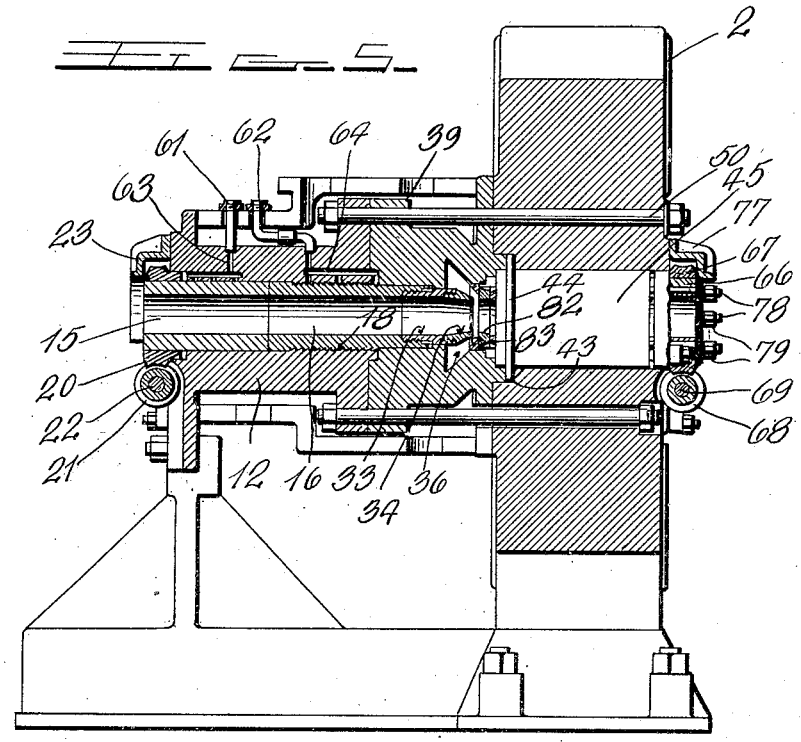
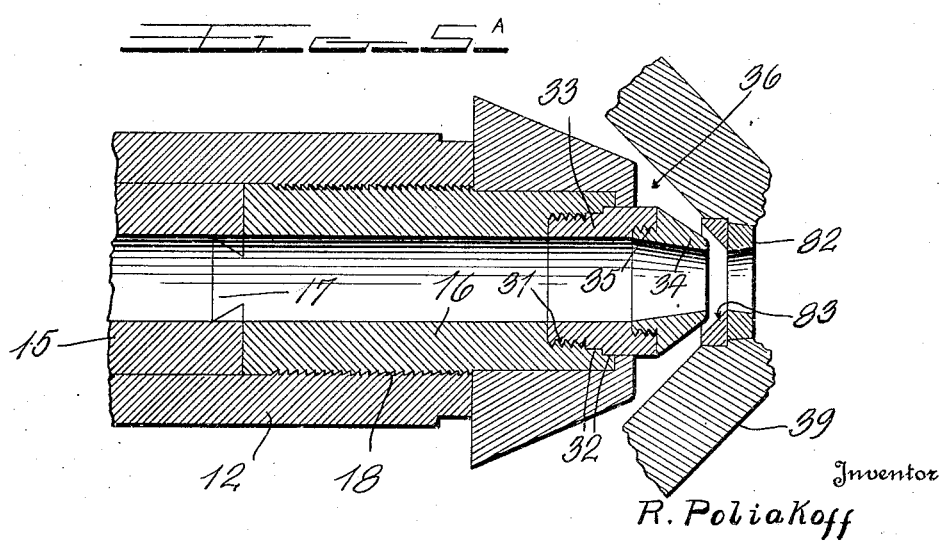
Inventor
R. Poliakoff
By Wilkinson & Giusta
Attorneys

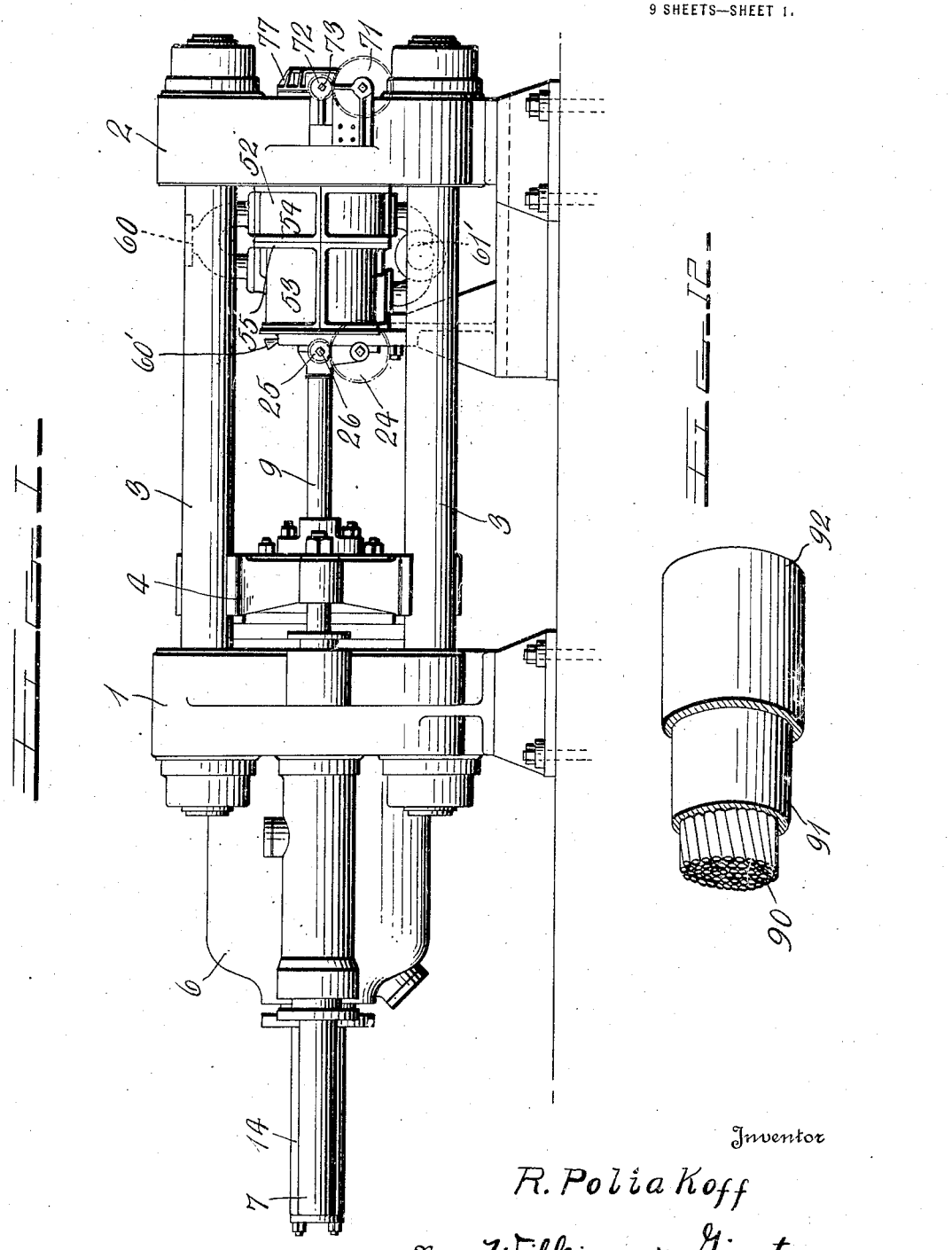

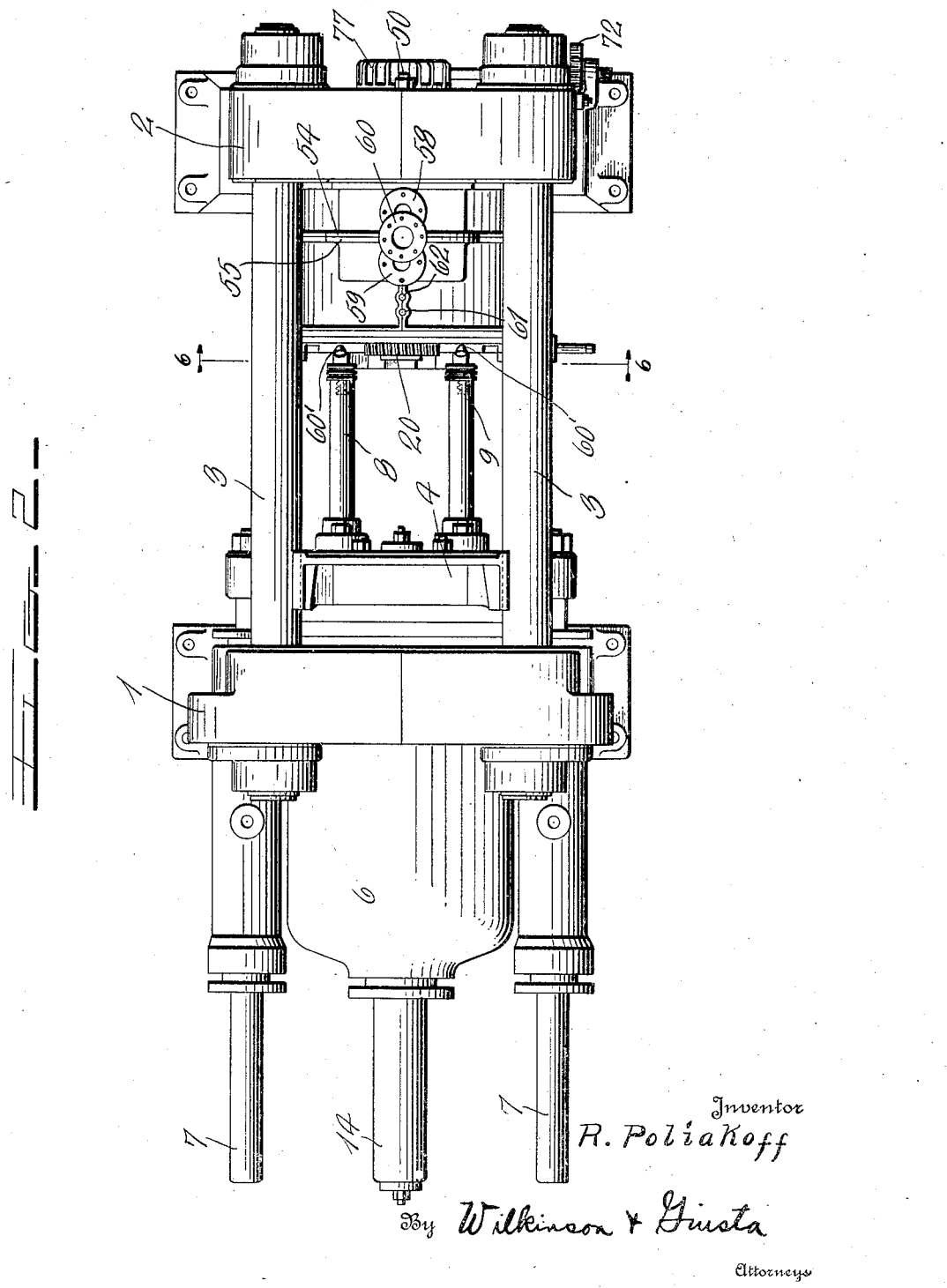

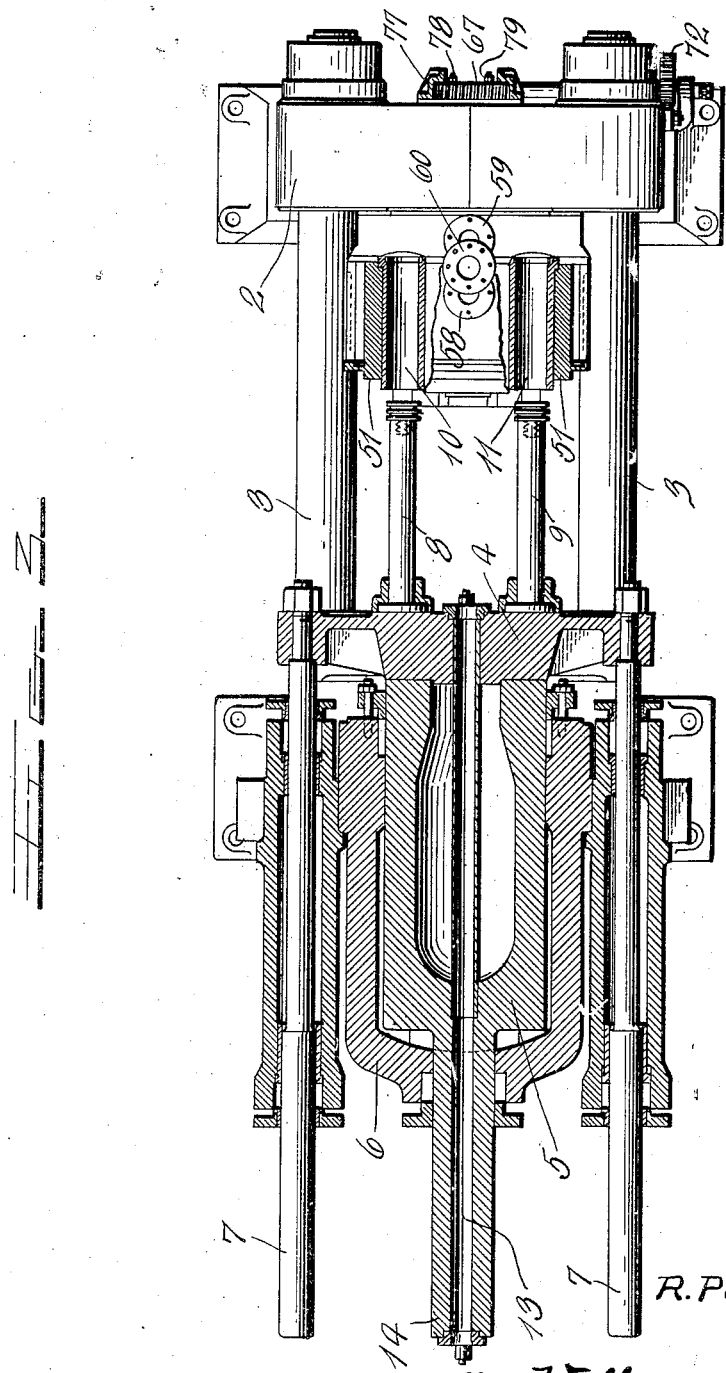

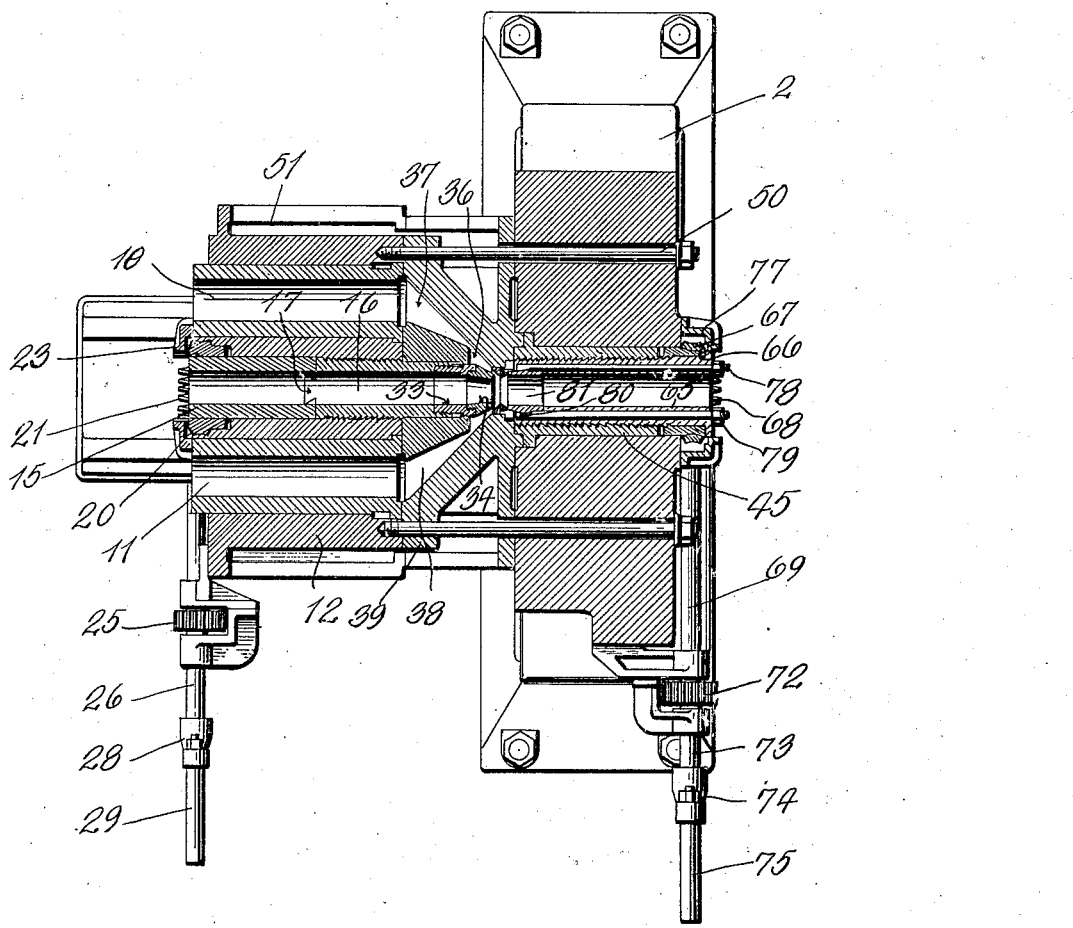

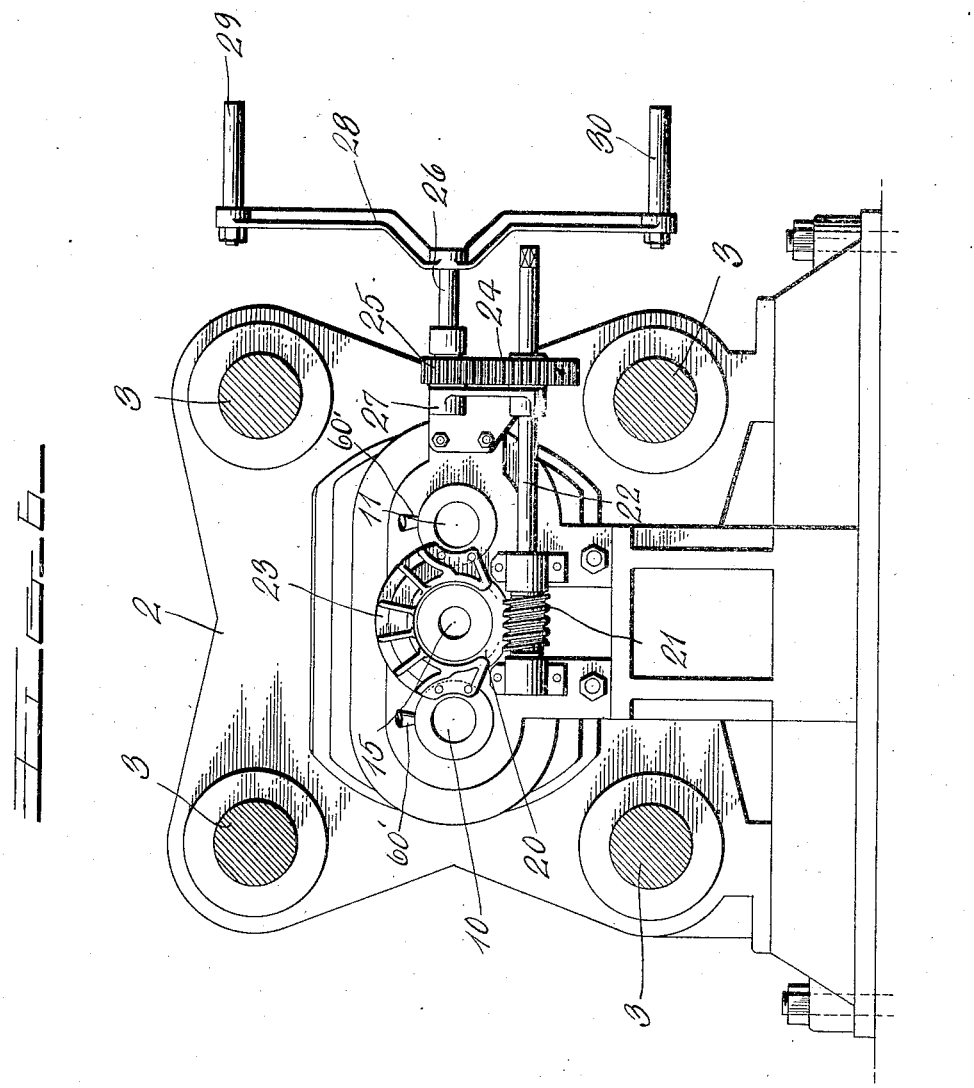

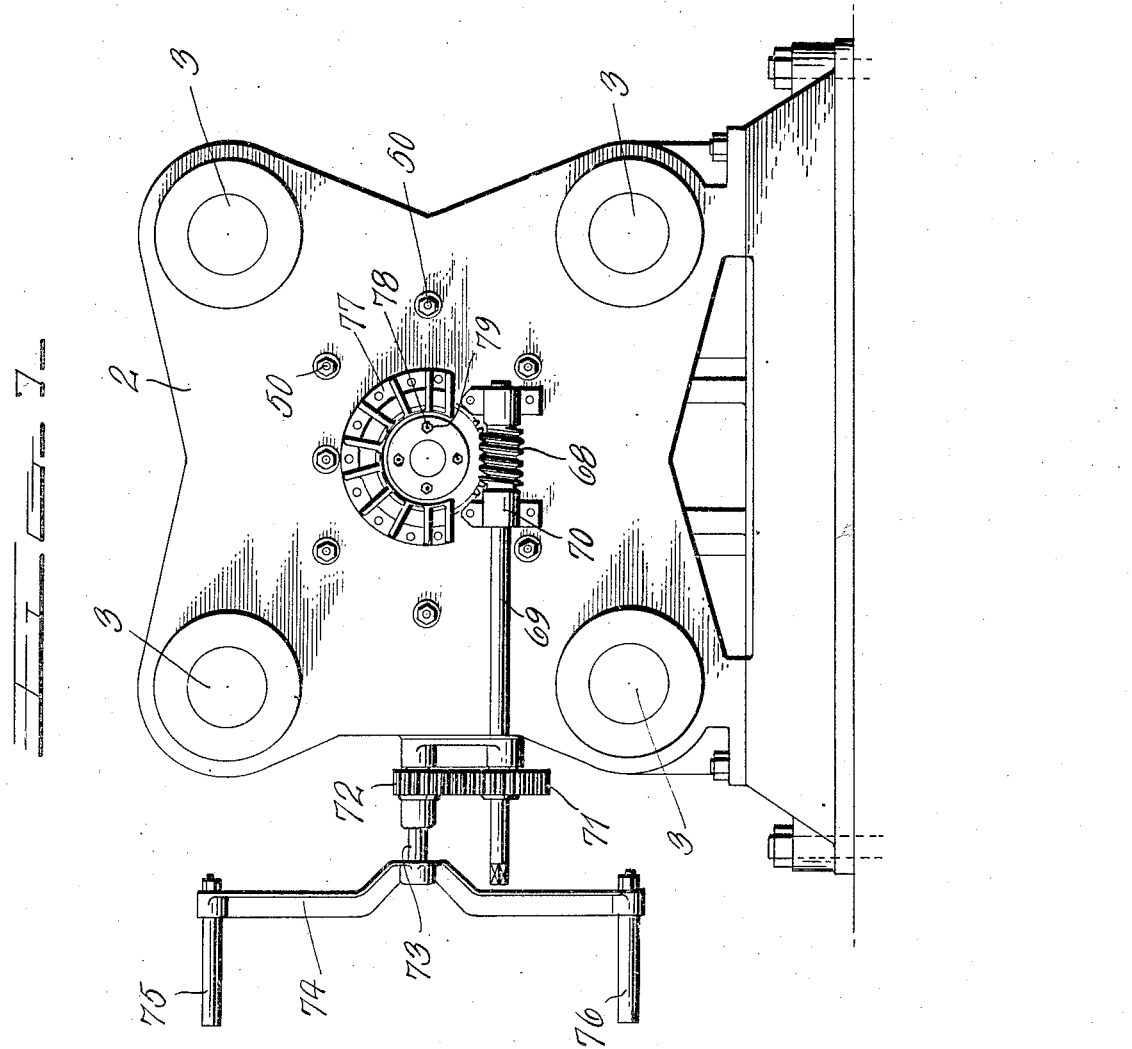

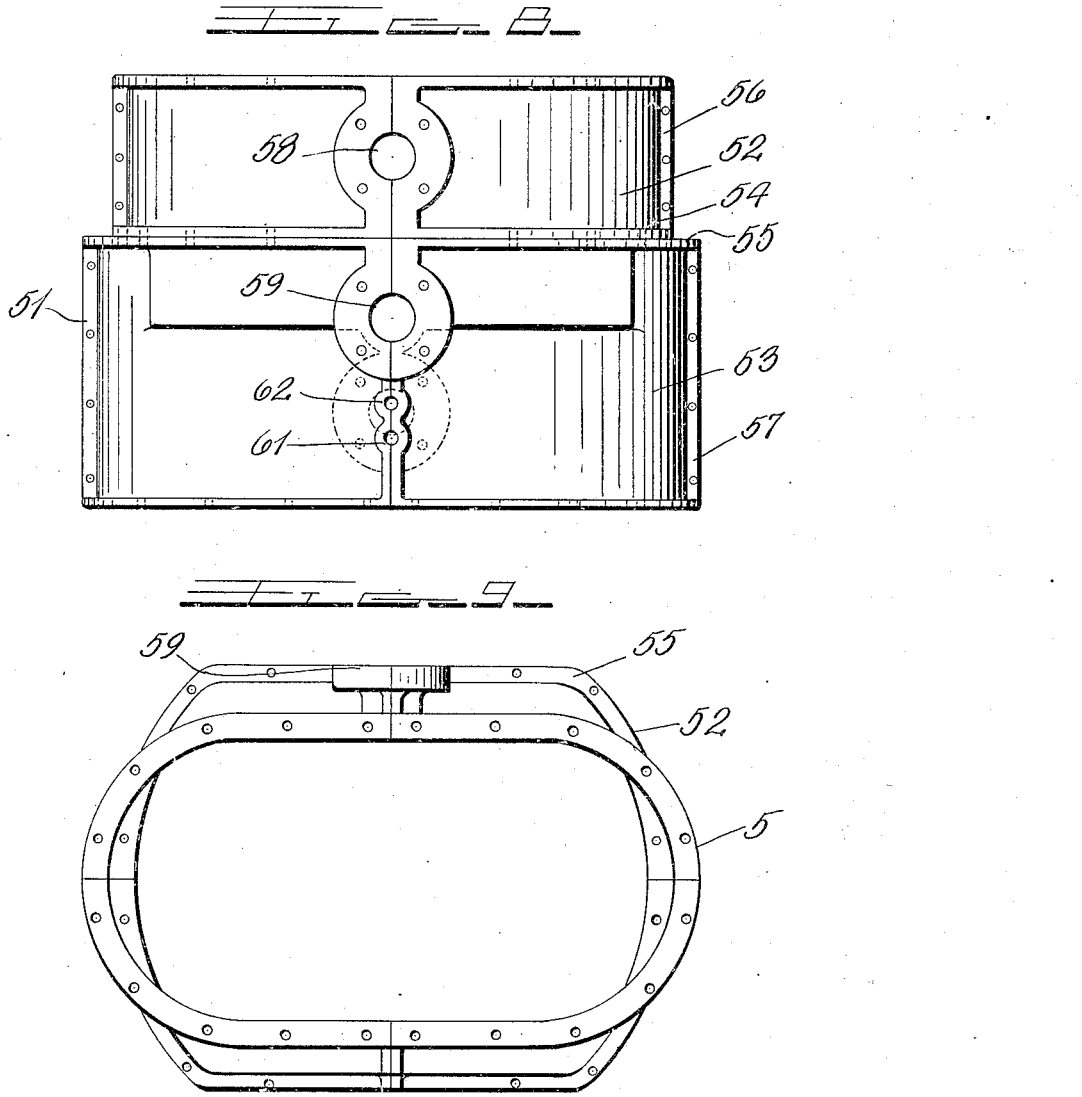

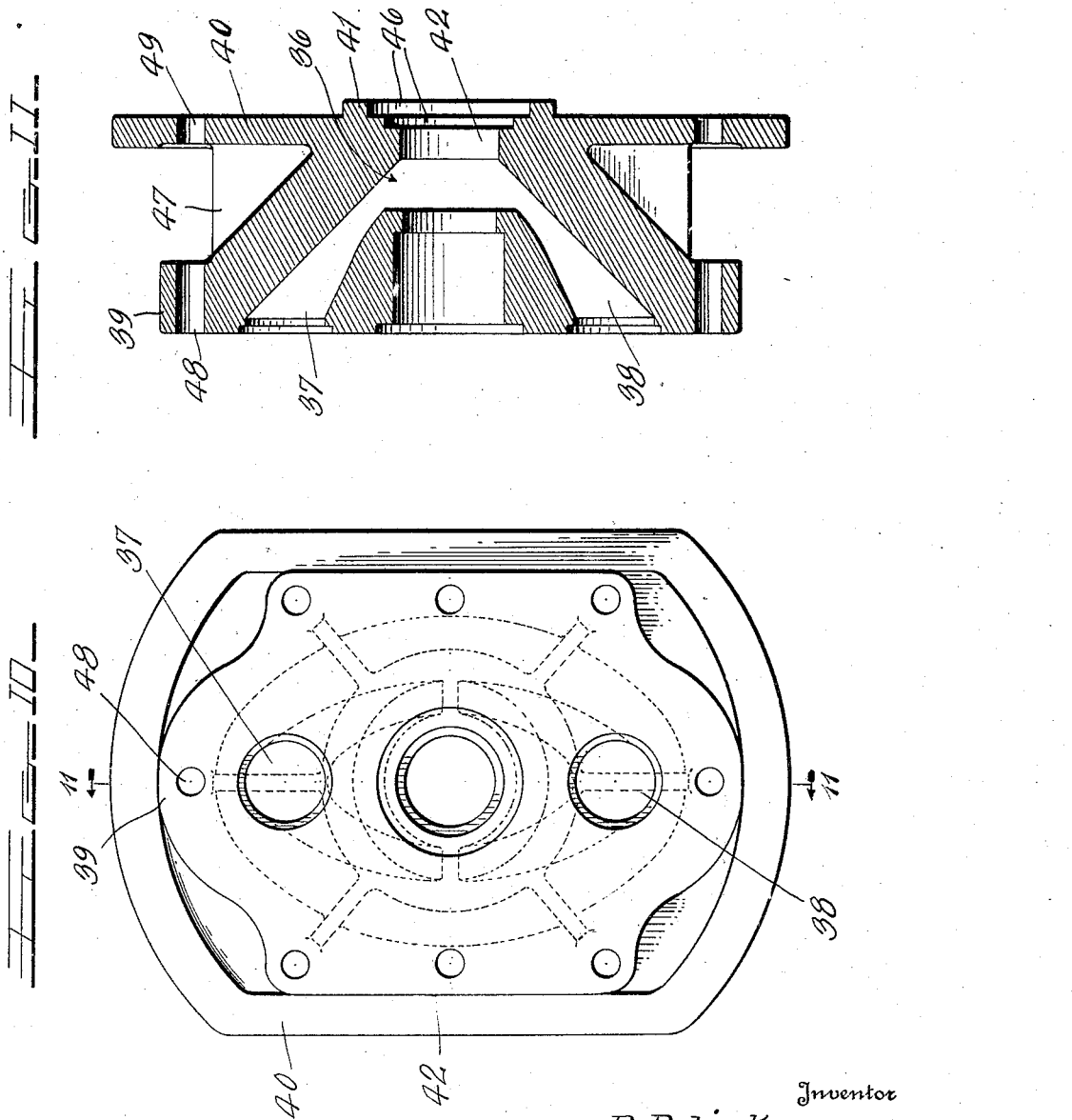

UNITED STATES PATENT OFFICE.

ROUVIME POLIAKOFF, OF NEW YORK, N. Y.

LEAD-CABLE-COVERING PRESS.

1,427,698.  Specification of Letters Patent.  Patented Aug. 29, 1922.

Application filed February 1, 1921. Serial No. 441,686.

*To all whom it may concern:*

Be it known that I, ROUVIME POLIAKOFF, a citizen of Russia, residing at New York, in the county of New York and State of New York, have invented certain new and useful Improvements in Lead-Cable-Covering Presses; and I do hereby declare the following to be a full, clear, and exact description of the invention, such as will enable others skilled in the art to which it appertains to make and use the same.

The present invention relates to improvements in lead cable covering presses and has for an object to provide an improved press for this purpose in which the several co-operating mechanisms will be grouped together compactly into a relatively simple composite machine capable of being operated efficiently and at small expense and being substantially continuous in operation.

Another object of the invention is to provide an improved machine for the covering of cables with lead or the like sheathing in which I provide readily removable and accessible parts for controlling the amount of lead flowing to the cable and united therewith.

A further object of the invention resides in providing an improved press in which the bearings which form the walls of the passages traversed by the cable are associated with mechanism which permits their withdrawal and replacement in a convenient and expeditious manner.

A still further object of the invention lies in providing an improved lead covering press in which the cable to be covered is let axially through the hydraulic cylinder and subsequently through passages which extend in alinement with the axis of the hydraulic cylinder and wherein the cable receives its covering after which it is permitted to issue from the machine.

With the foregoing and other objects in view, which will immediately suggest themselves to those skilled in this art, I have provided a lead covering press which is improved in many details of construction and in the grouping and arrangement of many of the parts, all as will be understood from the following description taken in conjunction with the accompanying drawings.

In the drawings, wherein like symbols refer to like or corresponding parts throughout the several views;

Fig. 1 is a view in side elevation of an improved lead cable covering press constructed according to the present invention;

Fig. 2 is a top plan view thereof;

Fig. 3 is a similar view with the hydraulic mechanism and lead cylinders shown in section;

Fig. 4 is an enlarged horizontal sectional view through the lead cylinders and adjacent parts;

Fig. 5 is a vertical sectional view through the same;

Fig. 5$^A$ is an enlarged fragmentary section view through the cable passage and the die;

Fig. 6 is a cross-sectional view taken on the line 6—6 in Fig. 2;

Fig. 7 is an end view of the press;

Fig. 8 is a plan view of the fluid heating jacket for the lead cylinders;

Fig. 9 is an end view of the same;

Fig. 10 is a view in elevation of the plate for carrying the die;

Fig. 11 is a vertical sectional view thereof taken on the line 11—11 in Fig. 10; and Fig. 12 is a fragmentary perspective view of the cable.

Referring more particularly to the drawings, 1 and 2 designate the heads of the machine which are situated apart the required distance and are securely bolted to the floor or other support of the building in which the press is installed.

The heads 1 and 2 are connected by suitable tie rods 3 which are preferably four in number and which form convenient guide ways in which to slidingly receive a cross head 4 carried at the forward end of the hydraulic plunger 5 which reciprocates in the cylinder 6 carried by the head 1.

Pull-backs 7 are provided to move back the cross-head 4 and hydraulic plunger and it will be understood that the construction of the hydraulic mechanism and its control are not particularly features of the present invention and I have therefore illustrated only so much of this mechanism as is deemed necessary to indicate its character and the function it performs.

The cross-head 4 carries two plungers 8 and 9 which project forwardly therefrom and are adapted to enter and move back and forth in lead cylinders 10 and 11. These lead cylinders 10 and 11 are carried by a block 12 through the center of which is made a passage for the cable. This passage is in alinement with a similar passage 13 made directly through the hydraulic cylinder 5 and its extension guide 14 as shown in Fig. 3.

In the passage in the block 12 are provided bearing sleeves 15 and 16 preferably connected together as indicated in Fig. 4 by a dove-tail joint 17 whereby the rotation of the rearward sleeve 15 will be imparted to the forward sleeve 16. This forward sleeve 16 has screw threaded engagement as represented at 18 with the block 12.

At its rear end the bearing sleeve 15 is provided with a worm wheel 20 engaging and driven by a worm 21 on a shaft 22 disposed transversely of the press. A flanged guard 23 is secured to the block 12 and extends about the worm wheel 20 and prevents it from being shifted axially in a direction rearwardly and away from the block 12.

The engagement of the worm wheel 20 with the bearing sleeve 15 is a sufficiently tight frictional engagement to impart rotary movement to the sleeve without interferring with the axial relative movement of the sleeve 15 through the worm wheel 20.

The worm shaft 22 as shown in Fig. 6 projects outwardly and is provided with a suitably shaped end to receive a cooperating tool or handle by which the turning of the shaft with small effort is made possible. To reduce the effort, a gear wheel 24 is made fast on the shaft 22 and placed in mesh with a pinion 25 on a second shaft 26 arranged parallel with the worm shaft 22.

This shaft 26 may be journaled in appropriate bearings 27 held by the framework of the press and it is adapted at its outer end to receive the cross-bar 28 carrying the two handles 29 and 30 at diametrically opposite points. The cross-bar 28 provides an increased leverage for turning the shaft 26 and the reduction gearing through the pinion 25 and spur wheel 24 renders the movement of the worm shaft 22 comparatively easy.

There is of course also a great reduction in the worm gearing 21, 20 which makes the turning of the bearing sleeves comparatively slow yet accomplished through a minimum of manual effort applied to the handles 29 and 30. By rotating the bearing sleeve 15, a similar movement will be communicated through the joint 17 to the companion bearing sleeve 16 which forms in effect a continuation of the rearward sleeve, and it will be obvious that a rotary movement in the proper direction will unscrew the sleeve 16 forcing it rearwardly with the other sleeve 15 being carried before it.

As soon as the screw threads 18 are cleared, the bearing sleeve 15 will project rearwardly to a sufficient extent to enable it to be grasped and the two bearings withdrawn. By an opposite rotation of the gearing the sleeves or their substitutes may be replaced.

As disclosed more particularly in Figs. 5 and 5A, the forward end of the bearing sleeve 16 is cut away interiorly and is provided with threads 31 and with stepped surfaces 32 to receive a collar 33 which projects forwardly beyond the end of the bearing sleeve 16 and carries a cone tip 34 removably engaged with the collar 33 as by means of the screw threads 35.

An annular space 36 extends about the cone tip 34 and receives the molten lead from the cylinders 10 and 11, the lead being fed forwardly of the tip 34 to the cable which is being passed through the opening made in said tip. The annular space 36 communicates with the cylinders 10 and 11 respectively by means of passages 37 and 38 made in the upper and lower portions of a block 39 shown in detail in Figs. 10 and 11.

This block 39 is provided with a substantially flat forward face 40 for resting against the adjacent portion of the head 2, an annular ring 41 being provided about the central opening 42, such ring being receivable in a recess 43 made in the rear face of the head 2. This ring 41 is adapted to engage a shoulder 44 which projects from a bushing 45 fitted through the head 2.

Stepped surfaces 46 are provided in the block 39 adjacent the opening 42 to receive the end of the bushing 45 and other adjacent parts as hereinafter described. Strengthening webs 47 extend between the outer portions of the block 39 and openings 48 and 49 are made in alinement with the two portions of the block in order to receive the bolts 50 which connect these parts to the head 2.

The bolts 50 are adapted to be threaded into jackets 51 which extend about the lead cylinders for the purpose of circulating steam or gases therethrough. The steam or gas is useful in fusing the lead should it become cold and solidified and it preserves the lead at suitable consistency so that it may be worked through the machine with the best results. The jacket 51 is shown more particularly in Figs. 8 and 9, and comprises front and rear sections 52 and 53 respectively which may be cast separately and provided with meeting flanges 54 and 55 riveted or otherwise secured together.

The jackets may also be made in segments which are united together along the flanges 56 and 57. Openings 58 and 59 are made for connection of heating pipes to the two sections of the jacket.

The molten lead is introduced through funnels 60' inserted into the cylinders 10 and 11 from a container above the machine. The steam or gases are introduced through a pipe 60 and are exhausted by a pipe 61'. As indicated in Fig. 5, oil pipes 61 and 62 may be connected through the jacket to ducts 63 and 64 for conveying oil to the bearings.

The bushing 45 is provided with internal screw threads adapted to receive the external threads on a sleeve 65 which fits through the opening in the head 2 and extends in alinement with the cable passage. A ring 66 is frictionally fitted about the outer end of the sleeve 65 and is provided with a concave annular groove to receive the convex inner portion of a worm wheel 67, as shown in Fig. 7, meshing with a worm 68 mounted on a shaft 69 which is journaled in bearings 70 carried by the head 2.

The shaft 69 extends laterally of the press and carries a gear wheel 71 meshing with a pinion 72 on a counter-shaft 73. Either the shaft 69 or the counter-shaft 73 is adapted to receive the intermediate socketed portion of the cross-bar 74 of the shaft turning implement which is provided with handles 75 and 76. Rotation of the crossbar 74 through operation of the handles 75 and 76 will turn the shaft 69 and its worm 68 and will consequently rotate the worm wheel 67, and if done so in one direction, it will cause the feeding forwardly of the sleeve 65, in the bushing 45.

A guard 77 prevents the worm wheel from moving axially. Rods 78 extend through the sleeve 65 and are provided with adjusting nuts 79 on their outer exposed ends, while their inner ends carry wedge blocks 80 moving upon a die sleeve 81 and acting to adjust axially the same when the rods are moved in a forward direction, the outer face of the sleeve 81 being beveled to correspond with the inclination given the adjacent face of the wedge 80.

A die ring is represented at 82, it being mounted rearwardly of the sleeve 81 and an oval stuffing ring 83 is mounted rearwardly of the die ring 82. The stuffing ring 83 is provided with a beveled edge on its side away from the die ring 82. The beveled edge is shown more particularly in Fig. 5^A and cooperates with the beveled edge of the tip 34 in order to direct the flow of the lead forwardly onto the cable and to distribute the lead pressure around the entire circumference of the cable.

The die ring 82 and the cone tip 34 control the thickness of the lead covering. The cable is shown in Fig. 12 and is composed of a series of strands 90 having an insulating sheathing 91.

The lead casing or covering is represented at 92. This lead casing or covering is generally only a fraction of an inch in thickness although it may be supplied to the cable in greater or less quantity.

In the casting operation the cable is introduced through the opening 13 in the extension 14 of the hydraulic plunger and is carried forwardly through the axial opening in the plunger 5 and cross-head 4 and into and through the bearing sleeves 15 and 16 in the block 12. The cable is continued past the opening forwardly of the cone tip 34 where it receives its lead covering, and past the dies and through the bearing sleeve 65.

The end of the cable is according to the usual practice wound about a drum. The winding of the cable on the drum serves to pull it through the press. As the cable passes through the press in the manner just described, the hydraulic plunger will be driven back and forth and consequently the plungers 8 and 9 will be reciprocated in the lead cylinders 10 and 11, which are being constantly supplied with molten lead from a container above.

As the plungers 8 and 9 move forwardly, they drive the molten lead before them out through the passages 37 and 38 and into the annular space 36 about the cone tip.

The lead in a highly molten condition, will be distributed entirely around the space 36 and it will consequently be fed uniformly to all portions of the cable. The distance apart of the cone tip 34 and the die 82 will regulate the amount of the lead flowing to the cable.

After having received the lead, the cable is pulled forwardly which causes any excess lead to be stripped from the cable by the die 82. Through the wedges carried by the rod 65 the annular space between 34 and 82 can be increased or decreased and consequently a covering of lead of a desired thickness may be supplied to the cable through the adjustment of these parts.

Steam or other heating medium may be constantly circulated through the jackets in order to keep the press hot to avoid congealing of the lead.

The use of the two lead cylinders 10 and 11 is found to be extremely advantageous over a single cylinder, as the feeding of lead from two diametrically opposite directions to the space 36 results in a more compact and effective feeding of the lead to the cable and in general reflects a more uniform character in the covering actually applied to the completed cable.

This construction is particularly advantageous as compared to the process generally prevailing in Europe and partly in this country in which the press comprises two hydraulic cylinders and the cable enters at right angles to the pistons.

In this process just referred to, actual experience has shown that it is necessary to secure a harmonious action between the two plungers if a uniform application of the lead is to be had, and this problem has given a great deal of trouble and has resulted in the provision of many special devices which in practice get out of order and are very troublesome.

These difficulties are avoided by the present construction of press, inasmuch as a single hydraulic cylinder operates simultaneously and uniformly both of the plungers 8 and 9 and there is therefore a constant balance on both sides of the press which has a beneficial effect in the production of a uniform covering for the cable.

The present invention is also distinctly advantageous as compared with all processes in which the cable is introduced at right angles to the path of movement of the plungers, whereas here it is drawn directly and axially through the hydraulic mechanism and is carried throughout the machine in a straight path so that its movement is facilitated and it enables the production of greater quantities of cable in a given time.

It will also be appreciated that the construction described and shown enables me to withdraw quickly and easily, for replacement or repairs, the bearing sleeves through which the cable is drawn and I am enabled to adjust the dies by the simple rotation of the nuts 79 which are on the exterior of the machine and easily and quickly accessible for this purpose.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. An improved lead cable covering press comprising a passage for the cable extending in a substantially horizontal direction and having a lead space about one portion thereof in communication with the passage, a plurality of cylinders in communication with the space at substantially opposite points, pistons moving in said cylinders, means to supply lead in a molten state to said cylinders, and a common means for simultaneously moving said pistons, substantially as described.

2. An improved lead cable covering press comprising a press structure having a substantially rectilinear passage therein from end to end for the cable and lying approximately horizontally, said press structure having a substantially annular space therein lying about the passage and being in communication therewith, a pair of cylinders in communication with said space at substantially opposite points, means for supplying molten lead to said cylinders, plungers in said cylinders for driving the lead therefrom into said space, and means for simultaneously advancing said plungers in said cylinders, substantially as described.

3. An improved lead cable covering press comprising a pair of lead cylinders, plungers therein, means for supplying molten lead to said cylinders, a lead passage having a space thereabout communicating with the passage and with said cylinders, and a single hydraulic mechanism connected fixedly to both of said plungers for simultaneously operating the same in said cylinders, substantially as described.

4. An improved lead cable covering press comprising a substantially centrally located hydraulic cylinder, a piston therein, offset plungers reciprocated by said piston, and lead cylinders receiving said plungers and in communication with a source of molten lead supply, said press provided with a space and with a passage therethrough for the cable, said space embracing the passage and being in communication therewith and with said lead cylinders at substantially opposite points, substantially as described.

5. An improved lead cable covering press comprising in combination a substantially centrally located hydraulic cylinder, a piston fitted therein to travel longitudinally of the press, a pair of offset plungers reciprocated simultaneously by said piston, said piston provided with a passage therethrough for the cable to be covered, a pair of offset lead cylinders adapted to receive said plungers and being in communication with a source of molten lead supply, a block carrying said cylinders and also having a passage for the cable in alinement with the passage through the piston, the passage in said block having a space surrounding the same and in communication therewith, said space being also in communication at substantially opposite points with said offset lead cylinders, and means to control the lead passing from said space onto the cable moving through said passages, substantially as described.

6. An improved lead cable covering press comprising in combination a substantially centrally located hydraulic cylinder at one end of the press disposed substantially horizontally, a piston reciprocating therein and having an axial passage therethrough for the cable, a pair of offset plungers reciprocated simultaneously by said piston, offset lead cylinders receiving said plungers and in communication with a source of molten lead supply, a block fitted about said offset lead cylinders and provided with a space therein communicating at substantially opposite points with the cylinders, said block also having a passage therethrough in alinement with the passage in the hydraulic piston to receive the cable, said space being in communication with the last-mentioned passage, and a die in the last-mentioned passage for regulating the thickness of the lead covering, substantially as described.

7. An improved lead cable covering press comprising in combination a hydraulic cylinder situated substantially coincident with the longitudinal center of the press and arranged substantially horizontally, a piston reciprocating therein, a cross head connected to the piston, guides for the cross head, a pair of plungers carried by said cross head in offset relation to the longitudinal center of the press, a pair of lead cylinders for receiving said plungers and being in communication with a source of molten lead supply, a block for holding said lead cylinders having a passage therein and a space surrounding the passage and communicating therewith, said block also having passages setting up communication between the space and said lead cylinders, means for controlling the flow of lead from the space into the passage, and means in the passage for controlling the thickness of the covering on the cable, substantially as described.

8. In a lead cable covering press, the combination of a pair of spaced apart heads, tie rods connecting the heads, a cross head guided in its movement by said tie rods, a piston connected to said cross head, a hydraulic cylinder receiving said piston, a pair of offset plungers carried by said cross head, a pair of lead cylinders in communication with a source of molten lead supply and adapted to receive said plungers, a block carrying said lead cylinders provided with a passage and a space surrounding and communicating with the passage and with the lead cylinders at substantially opposite points, and means for controlling the amount of lead passing to the cable and the thickness of the coating applied to the latter, substantially as described.

9. In a lead cable covering press, the combination of a block having a central passage therethrough and provided with an annular space extending about and being in restricted communication with the passage, a pair of lead cylinders communicating with the space at substantially opposite points and being connected to a source of molten lead supply, plungers reciprocating in said cylinders, means centrally located with respect to the plungers and adapted to move the same together through said cylinders, and a die situated in said passage beyond the point at which the space communicates therewith, substantially as described.

10. In a lead cable covering press, the combination of a block providing a passage therethrough and having a space extending about the passage on all sides and being in communication therewith, a pair of lead cylinders communicating at one end with the space, said cylinders being mounted at diametrically opposite points with respect to the space, means wherever said cylinders are placed in communication with a source of molten lead supply, heating means extending about said cylinders and space, plungers operating in said cylinders, and centrally disposed means for simultaneously driving said plungers, substantially as described.

11. In a lead cable covering press, the combination of lead cylinders in communication with a source of lead supply, plungers moving in said cylinders, means for driving said plungers, a passage for the cable to be covered extending between said cylinders, and a plate secured forwardly of said cylinders and having an opening therein alining with the passage and being provided with a space extending about the passage and in communication therewith, said plate further provided with channels connecting the ends of the cylinders with said space, substantially as described.

12. In a lead cable covering press, the combination of a block, cylinders therein placed in communication with a source of molten lead supply, a plate fitted against said block and having channels communicating with the ends of the cylinders, said plate also having an annular space in communication with said channels, a passage through the block and passing axially through said space for the movement of the cable, said passage being in restricted communication with the space, means for controlling the flow of the molten lead from the space into said passage, and pistons movable in said cylinders, substantially as described.

13. In a lead cable covering press, the combination with a block, cylinders therein, pistons reciprocating in the cylinders, means for placing said cylinders in connection with a source of molten lead supply, a plate fitted against said cylinders, said block and plate having a passage therethrough for the movement of the cable to be covered, said plate provided with a space extending about said passage and communicating therewith, said plate also provided with channels placing the cylinders in communication with said space, and a cooperating tip and die for regulating the passage of the lead from said space to the cable, substantially as described.

14. In a lead cable covering press, the combination of a block, cylinders therein arranged in communication with a source of molten lead supply, pistons fitted in said cylinders, means for reciprocating in said cylinders, a plate fitted against said block and having channels converging forwardly and in communication at their rear ends with said cylinders, said plate provided with an annular space at the forward convergent ends of said channels, said block and plate having a passage therethrough for the movement of the cable to be covered, said space being in communication with the passage, a die ring carried by said plate between said passage and space, and a stuffing ring also carried by said plate forwardly of the feeder ring, substantially as described.

15. In a lead cable covering press, the combination of a block, cylinders therein in communication with a source of molten lead supply, pistons reciprocating in the cylinders, a plate removably fitted against said block and provided with forwardly convergent channels having their rear divergent ends in direct open communication with the forward ends of said cylinders, said plate provided with an annular space at the central portion thereof in communication with the convergent ends of said channels, said block and plate having a passage therethrough for the movement of the cable to be covered, said space being in communication with the passage, a cone tip forming a portion of said passage and located centrally of said space, and a die placed a distance from said tip and carried by said plate, substantially as described.

16. In a lead cable covering press, the combination of a block, cylinders therein, pistons operating in the cylinders, a plate removably fitted against the forward end of said block and provided with forwardly convergent channels having their rear ends opening into the cylinders, said plate provided with an annular space centrally thereof and in communication with the forward converging ends of said channels, said block and plate having a passage therethrough placed in communication with said space, a cone tip located centrally of the space, a stuffing ring carried by the plate forwardly and spaced from said tip, a die ring also carried by the plate and arranged forwardly of the feeder ring, and a die sleeve extending forwardly of the die ring, substantially as described.

17. In combination, cylinders in communication with a source of lead supply, pistons operating therein, a plate provided with an annular space placed in communication with said cylinders, a passage extending between the cylinders and through the plate and being in communication with said space, a stuffing ring carried by the plate between the space and passage, a die ring disposed forwardly of the stuffing ring and also carried by the plate, and an adjustable die sleeve lying forwardly of the die ring, substantially as described.

18. In combination, a lead cable covering press comprising a block having a passage therein for the cable, and cylinders in the block, means to supply molten lead to the cylinders, plungers in the cylinders, a plate having channels alining with the cylinders and provided with an annular space in communication with the channels and with the passage, means for controlling the flow of lead from the space to the cable, die means in the passage, and means acting on said die means to regulate the space for the lead covering, substantially as described.

19. In combination, lead feeding means, a passage for the cable receiving lead from said means, die means in the passage, and wedges acting on said die means to regulate the space for the lead covering, substantially as described.

20. In combination, lead feeding means, a passage for the cable in communication with the feeding means, a die sleeve having a sloping surface arranged in said passage, and wedges movably associated with said die sleeve and acting on the inclined surface thereof whereby to regulate the space for the lead covering, substantially as described.

21. In combination, lead feeding means, a passage for the cable in communication therewith, a die sleeve in the passage, a bearing sleeve forming a portion of the passage, and longitudinally movable rods carried by said bearing sleeve and having wedges acting on the die sleeve to regulate the space for the lead covering, substantially as described.

22. In combination, a head, a bushing therein provided with screw threads, a bearing sleeve threaded into said bushing and forming a portion of a passage for the cable, means for supplying lead to the cable, and means for rotating said bearing sleeve and screw it out of the bushing, substantially as described.

23. In combination, a head, a bushing therein, a bearing sleeve fitted into said bushing and being removable therefrom upon rotation, said bearing sleeve forming part of a passage for the cable, means for supplying lead to the cable, and a worm gearing for rotating said bearing sleeve, substantially as described.

24. In combination, a head, a bushing therein, a bearing sleeve threaded into the bushing and forming part of a passage for the cable, means for supplying lead to the cable, a worm wheel placed relatively to said bearing sleeve for turning the latter, a worm meshing with said worm wheel, and reduction gearing for rotating said worm, substantially as described.

25. In a lead press, the combination of a block having a passage therethrough, a pair of bearing sleeves fitted in said passage and cable together, means whereby said bearing sleeves may be withdrawn axially from said block, said sleeves forming a passage for the cable, and means for supplying lead to said cable as it moves through the passage, substantially as described.

26. In combination, a block, lead feeding means carried thereby, a pair of bearing sleeves fitted in said block and forming a passage for the cable, means whereby lead from the feeding means may be conveyed to the cable in the passage, one of said sleeves having a threaded engagement with said block, a dove-tail joint between said sleeves, and means for rotating one of the sleeves to withdraw axially both sleeves from the block, substantially as described.

27. In combination, a head, a block placed rearwardly thereof, a plate between the block and head, means for connecting the block and plate to said head, a sectional heating jacket placed about said block and plate, cylinders in the block in connection with a source of molten lead supply, a passage going through said block, plate, and head and being placed in connection through said plate with the cylinders, pistons reciprocating in the cylinders, bearing sleeves in the block and head, and separate means for withdrawing said sleeves in opposite directions, substantially as described.

ROUVIME POLIAKOFF.